United States Patent [19]
Ivey

[11] 3,974,743
[45] Aug. 17, 1976

[54] FLUID ACTUATOR FOR A ROTATING ENGAGEABLE FRICTION DEVICE

[75] Inventor: John S. Ivey, Hitchin, England

[73] Assignee: Borg-Warner Corporation, Chicago, Ill.

[22] Filed: Aug. 16, 1971

[21] Appl. No.: 171,934

[30] Foreign Application Priority Data
Sept. 22, 1970 United Kingdom............... 44999/70

[52] U.S. Cl.................................... 91/422; 137/56; 192/106 F
[51] Int. Cl.².................. F15B 11/08; F15B 13/04; F16D 25/06
[58] Field of Search........... 91/422, 222; 192/106 F; 137/56

[56] References Cited
UNITED STATES PATENTS

| | | | |
|---|---|---|---|
| 2,436,384 | 2/1948 | Fletcher et al..................... | 137/56 X |
| 2,740,512 | 4/1956 | Fischer............................ | 192/106 F |
| 2,864,479 | 12/1958 | Schindler............................. | 192/85 |
| 2,954,040 | 9/1960 | Bolster............................ | 192/106 F |
| 3,282,385 | 11/1966 | Snyder................................... | 192/85 |
| 3,578,120 | 5/1971 | Hilpert.................................. | 137/56 |

*Primary Examiner*—Irwin C. Cohen
*Attorney, Agent, or Firm*—James E. Tracy

[57] ABSTRACT

A rotating annular piston is hydraulically actuated to engage a rotating friction device, such as a clutch or brake, by introducing fluid pressure to an apply chamber for the piston. Disengagement is subsequently effected by exhausting fluid from the chamber, after which a centrifugal pressure head release valve in a wall of the chamber releases any residual entrapped fluid from the chamber in order to prevent undesired false actuation of the rotating piston that may otherwise occur due to centrifugal force acting on the residual fluid. The valve comprises a metallic ball subject to centrifugal force tending to move it radially outward from the piston axis but held in a tapered or conical seat of an exhaust port, thereby blocking the port, by fluid pressure supplied to the apply chamber. In the absence of that fluid pressure, however, the centrifugal force exerted on the ball unseats it and opens the port. By tilting the seat axis relative to the piston axis the ramp angle, formed between the piston axis and the portion of the seat radially outermost from the piston axis, may be minimized with a resultant maximizing of the rotational speed at which the piston may operate. The closer that the outermost seat portion is to being parallel to the piston axis, and thus perpendicular to the centrifugal force, the greater that force must be before the ball will unseat when there is fluid pressure in the chamber to move the piston in the apply direction.

1 Claim, 2 Drawing Figures

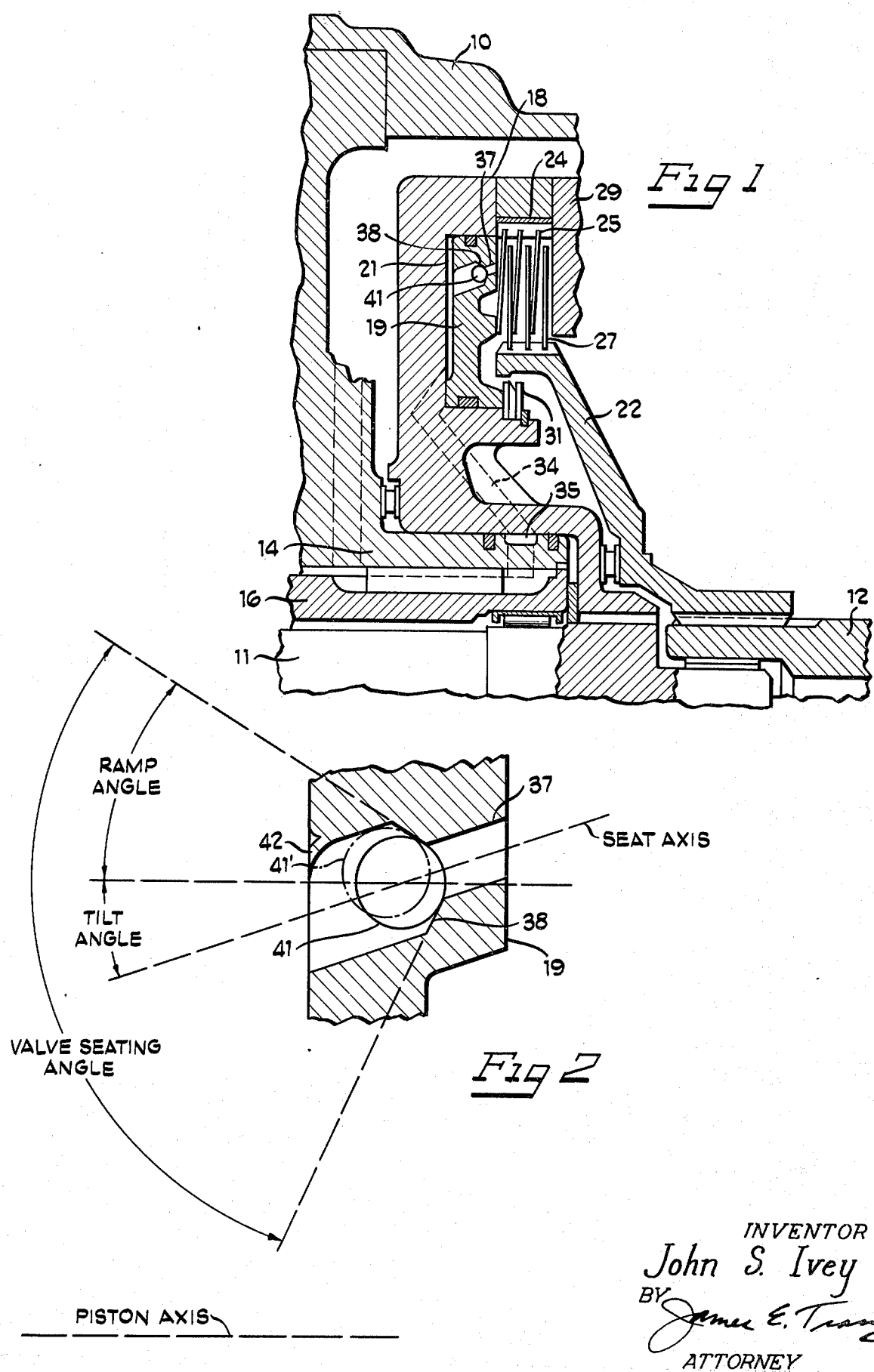

FLUID ACTUATOR FOR A ROTATING ENGAGEABLE FRICTION DEVICE

BACKGROUND OF THE INVENTION

Centrifugal release ball check valves have been utilized in transmission structures to release residual fluid from the apply chamber for a piston-controlled rotating friction device, such as a brake or clutch, when the friction device is disengaged. If no such check valve were present, centrifugal force exerted on the residual fluid may actuate the piston and engage the friction device at an undesirable time. In the structures wherein the friction device and its actuator rotate at relatively high engine speeds and where relatively large diameters are employed, thus developing relatively high centrifugal forces, it is most difficult if not impossible to construct a centrifugal pressure head release valve in which the ball readily seats and properly seals the exhaust port when necessary to maintain fluid pressure in the apply chamber and then readily unseats when required to bleed off the residual fluid. The high centrifugal force on the ball makes it difficult for the fluid pressure to maintain the ball seated. If the valve seating angle is made wide enough to facilitate reliable unseating when desired, the centrifugal force on the ball is likely to unseat it during the presence of fluid pressure. On the other hand, if the seating angle is narrowed sufficiently so that the ball cannot be unseated by centrifugal force when there is fluid pressure, the ball will then sometimes wedge in its seat and fail to eject when fluid pressure is removed.

As a consequence, prior centrifugal pressure head release valves have been subject to a maximum speed limitation so that the centrifugal forces may be kept within a workable range. Such valves could not be used when the fluid actuator had to operate at extremely high rotational speeds. This shortcoming has now been remedied by the present invention. The disclosed centrifugal pressure head release valve functions properly at rotational speeds considerably greater than heretofore possible.

Accordingly, it is an object of the invention to provide a new and improved centrifugal pressure head release valve for a fluid actuator.

It is another object of the invention to provide a novel centrifugal release ball check valve suitable for use at much greater speeds than previously possible.

SUMMARY OF THE INVENTION

An actuator, for a rotating engageable friction device, constructed in accordance with the invention comprises a rotary housing containing an annular pressure apply chamber for hydraulically controlling an annular rotating piston spring-biased to be normally established in a home position in which the friction device is disengaged but movable, in response to supplying fluid pressure to the apply chamber, to an actuating position wherein the piston engages the friction device. Means are provided for introducing fluid pressure to the apply chamber to move the piston to its actuating position and for subsequently exhausting fluid from the chamber to effect return of the piston to its home position. There is a centrifugal pressure head release valve including an exhaust port, extending through a wall of the apply chamber and having a conical valve seat the larger end of which is adjacent the chamber, and a metallic ball which tends to move radially outward from the piston axis as a result of centrifugal force but is urged toward and held in the seat by fluid pressure, thereby closing the port, when such pressure is supplied to the apply chamber. The ball is ejected out of the seat by centrifugal force in the absence of such fluid pressure and opens the port to release any residual entrapped fluid from the chamber in order to prevent undesired false engagement of the friction device otherwise resulting from centrifugal force acting on such residual fluid. The piston and seat axis are canted with respect to each other to minimize the ramp angle, formed between the piston axis and the portion of the seat radially outermost from the piston axis, which in turn maximizes the rotational speed at which the piston may operate.

DESCRIPTION OF THE DRAWING

The features of the invention which are believed to be novel are set forth with particularity in the appended claims. The invention, together with further objects and advantages thereof, may best be understood, however, by reference to the following description in conjunction with the accompanying drawing in which:

FIG. 1 is a cross-sectional view of part of a transmission structure incorporating a fluid actuator constructed in accordance with one embodiment of the invention; and, FIG. 2 is an enlarged view of the portion of the fluid actuator of FIG. 1 which contains the centrifugal pressure head release valve.

DESCRIPTION OF THE ILLUSTRATED EMBODIMENT

The disclosed transmission structure includes a stationary transmission case 10 having an input shaft 11 and an intermediate shaft 12 for transmitting drive to the gearing portion of the transmission. The stationary case has an annular flange or hub portion 14 for receiving a stationary hollow shaft 16 in which input shaft 11 is piloted and journalled. A clutch housing 18, rotatably mounted on hub 14, contains an annular piston 19 mounted for axial movement within the housing and which rotates at the same speed as housing 18. An annular pressure apply chamber or cavity 21 is provided for piston 19. Intermediate shaft 12 has a clutch drum 22 drivingly connected thereto. A clutch 24 includes a series of clutch discs 25 drivingly connected to clutch housing 18 and a series of clutch discs 27 interleaved with discs 25 and drivingly connected to drum 22.

Integral with housing 18 is a backup plate or reaction member 29 for retaining the clutch discs in place when piston 19 is moved to its actuating position in which clutch 24 is engaged and rotating clutch housing 18 is drivingly connected to driven member 22. As shown, clutch 24 is disengaged and piston 19 is in its disapply or home position. A wave-type spring 31 effectively spring-biases piston 19 so that it normally occupies that position.

Any suitable fluid pressure source and control means may be employed for introducing fluid pressure to chamber 21 to shift piston 19 to its actuating position and for subsequently exhausting fluid from that chamber to permit spring 31 to return the piston to its disapply position. In the illustrated case, a fluid passage 34 (shown in hidden lines) extends through rotary housing 18 and communicates with a circumferential groove 35 in stationary hub 14 to facilitate both the delivery of fluid pressure to chamber 21 and the exhaustion of that fluid pressure from the chamber.

The centrifugal pressure head release valve, in accordance with the invention, ensures that after fluid has been exhausted through passage 34 and clutch 24 disengages, the residual entrapped fluid in chamber 21 will then be released so that centrifugal force cannot operate on that residual fluid and develop sufficient pressure on the back of piston 19 to move it and engage clutch 24. This is achieved by means of an exhaust port or passage 37 (best seen in FIG. 2) which extends through a wall of chamber 21 at an acute angle with respect to the piston axis, the axes of port 37 and the piston being coplanar. While in the disclosed embodiment port 37 is located in piston 19, it could, of course, be formed in housing 18. Machined in port 37, and coaxial therewith, is a tapered or conical valve seat 38, the larger end of which is adjacent chamber 21. The release valve also includes a valve element, in the form of a metallic ball 41, which is loosely captivated in the enlarged portion of exhaust port 37 by means of, for example, staking over the material (see reference number 42) of piston 19 after the ball has been inserted in the port.

while only a single release valve is shown in the drawing, it is contemplated that a plurality of such valves would be uniformly spaced around the circumferential portion of piston 19.

In operation, when fluid pressure is supplied via passage 34 to chamber 21 and piston 19 effects engagement of clutch 24, ball 41 is urged toward and held in seat 38 by the fluid pressure in chamber 21, thereby sealing port 37. Since piston 19 is rotating, centrifugal force will tend to centrifuge ball 41 radially outward from the piston axis and out of seat 38 to its unseated position as indicated in dashed construction in FIG. 2 by the ball labeled 41'. In accordance with the invention, however, such centrifugal force will be ineffective when fluid pressure is present in chamber 21, and this is true even when piston 19 operates at an extremely high rotational speed and develops a correspondingly high centrifugal force. This is made possible because the coplanar piston and seat axes are canted or tilted with respect to each other as a consequence of which the ramp angle, formed between the piston axis and the portion or surface of seat 38 radially outermost from the piston axis (as illustrated in FIG. 2), is relatively small; and is much smaller than the angle between the radially innermost seat portion or surface and the piston axis.

To explain, the centrifugal force on ball 41 is in a direction radially outward from and thus perpendicular to the piston axis. The force may be resolved into two vector components — one normal or perpendicular to the radially outermost portion of seat 38 and the other parallel to that seat portion. The smaller the ramp angle (and hence the greater the tilt angle formed between the seat and piston axes), the greater will be the force vector component normal to the outermost seat portion and the smaller will be the force component parallel to the seat portion. Since a parallel force is required to move ball 41 to its unseated position, by minimizing the ramp angle a very high centrifugal force may be tolerated on ball 41 and yet the component of that force parallel to the outermost seat portion will be insufficient to overcome the fluid pressure in chamber 21, with the result that ball 41 remains in its seated position. Piston 19 may thus operate at extremely high rotational speeds and ball 41 will remain seated when fluid pressure is present in chamber 21.

When fluid pressure is exhausted through passage 34 and spring 31 restores the piston to its home position, the centrifugal force acting on ball 41 will then be effective to move it to its unseated position so that port 37 opens, whereupon any retained fluid in chamber 21 bleeds off though the port.

By an appropriate selection of the tilt and valve seating angles, operation at any combination of fluid pressure and speed range may be achieved. The ball will not centrifuge from its seat at the maximum operating speed when fluid pressure is supplied and yet upon fluid pressure exhaust, and at minimum operating speed, the ball will eject out of its seat in response to centrifugal force.

Although in the illustrated case valve seat 38 and port 37 share the same axis, this is not essential. Only the seat axis need be canted relative to the piston axis. The port and piston axes may be parallel. It is also not essential that the fluid actuator be incorporated in a transmission mechanism. It may be used in any environment where a rotating engageable friction device is controlled by a rotating piston, such as in a brake structure.

While a particular embodiment of the invention has been shown and described, modifications may be made, and it is intended in the appended claims to cover all such modifications as may fall within the true spirit and scope of the invention.

I claim:

1. A fluid actuator comprising:
   a rotating piston member having a piston axis;
   biasing means for establishing said piston member normally in a disapply position;
   a rotary housing member containing an annular pressure apply chamber for hydraulically controlling said rotating piston member which is movable axially, in response to fluid pressure in said apply chamber, from its disapply position to an actuating position;
   means for introducing fluid pressure to said chamber to move said piston member axially to its actuating position and for subsequently exhausting fluid from said chamber to effect return of said piston member to its disapply position;
   and a centrifugal pressure head release valve including an exhaust port, extending through one of said members and having a conical valve seat symmetrical around a seat axis, the larger end of which conical valve seat is adjacent said chamber, and a ball valve element which tends to move radially outward from said piston axis and along the radially outermost portion of said conical seat as a result of centrifugal force but is urged toward and held in said conical valve seat by fluid pressure in said chamber, thereby closing said port, when such fluid pressure is applied to said chamber,
   said ball valve element being ejected out of said conical seat, by centrifugal force in the absence of such fluid pressure in said chamber, and opening said port to release any residual entrapped fluid from said chamber to prevent undesired false actuation of said piston member resulting from centrifugal force acting on such residual fluid;
   said piston and seat axes being canted with respect to each other so that the angle between said piston axis and the radially outermost portion of said conical seat is substantially smaller than the angle between said piston axis and the radially innermost portion of said conical seat in order to effectively increase the centrifugal force otherwise required to unseat said ball valve element when fluid pressure is present, thereby increasing the maximum rotational speed at which said fluid actuator may operate.

* * * * *